(12) United States Patent
Karasek et al.

(10) Patent No.: US 11,565,560 B2
(45) Date of Patent: Jan. 31, 2023

(54) SYSTEM FOR CONDUCTING CABLES IN A VEHICLE HAVING VEHICLE PARTS MOVABLY CONNECTED TO ONE ANOTHER

(71) Applicant: Hübner GmbH & Co. KG, Kassel (DE)

(72) Inventors: Jens Karasek, Kaufungen (DE); Jan-Hendrick Dicke, Baunatal (DE); Ralf Schulz, Habichtswald (DE); Lilia Schumann, Vellmar (DE)

(73) Assignee: HÜBNER GMBH & CO. KG, Kassel (DE)

( * ) Notice: Subject to any disclaimer, the term of this patent is extended or adjusted under 35 U.S.C. 154(b) by 938 days.

(21) Appl. No.: 16/406,201

(22) Filed: May 8, 2019

(65) Prior Publication Data
US 2019/0351722 A1 Nov. 21, 2019

(30) Foreign Application Priority Data
May 17, 2018 (EP) ........................ 8173030

(51) Int. Cl.
*B60D 5/00* (2006.01)
*B60D 1/62* (2006.01)

(52) U.S. Cl.
CPC .............. *B60D 5/006* (2013.01); *B60D 1/62* (2013.01)

(58) Field of Classification Search
CPC .................................. B60D 5/006; B60D 1/62

USPC .......................................................... 280/403
See application file for complete search history.

(56) References Cited

U.S. PATENT DOCUMENTS

| | | | | |
|---|---|---|---|---|
| 1,640,159 | A * | 8/1927 | Suarez ..................... | B61G 5/10 105/4.1 |
| 6,076,470 | A * | 6/2000 | Koch ...................... | B60D 5/006 105/15 |
| 8,366,132 | B2 * | 2/2013 | Browne .................. | B61D 17/22 105/8.1 |
| 8,523,215 | B2 * | 9/2013 | Browne .................. | B61D 17/20 105/8.1 |
| 10,195,915 | B2 * | 2/2019 | Browne .................. | B60D 5/006 |
| 10,576,800 | B2 * | 3/2020 | Browne ............... | B62D 47/025 |

FOREIGN PATENT DOCUMENTS

| | | |
|---|---|---|
| DE | 102010011903 A1 | 11/2011 |
| DE | 102016214159 A1 | 2/2018 |
| EP | 3210803 A1 | 8/2017 |
| GB | 2551576 A | 12/2017 |
| WO | 9742045 A1 | 11/1997 |

* cited by examiner

*Primary Examiner* — Kevin Hurley
*Assistant Examiner* — Hosam Shabara
(74) *Attorney, Agent, or Firm* — Dinsmore & Shohl LLP (57) ABSTRACT

A system for conducting cables in a vehicle having vehicle parts that are movably connected to one another. The system for conducting cables having a stabilization element and a reception element for receiving a cable and the reception element is movably arranged at the stabilization element.

17 Claims, 4 Drawing Sheets

SYSTEM FOR CONDUCTING CABLES IN A VEHICLE HAVING VEHICLE PARTS MOVABLY CONNECTED TO ONE ANOTHER

REFERENCE TO RELATED APPLICATION

This application claims priority from European patent application No. EP18173030.0, filed May 17, 2018, the entire content of which is incorporated herein by reference.

FIELD OF THE INVENTION

The invention relates to a system for conducting cables or lines in a vehicle, in particular in a vehicle having vehicle parts that are movably connected to one another, having the features in accordance with the preamble of claim 1. The invention further relates to a passage having such a system for conducting cables and to a vehicle having such a system for conducting cables and/or having such a passage.

BACKGROUND OF THE INVENTION

EP 3 210 803 A1, for example, discloses a passage between two vehicle parts connected to one another in an articulated manner, with a guide device for supply lines extending in the roof region being provided in the roof region of the vehicle parts. The guide device comprises a spring device for conducting the supply lines. The spring device can extend, for example, in a C shape from one vehicle part to the next. Cable carriers are arranged at the spring device by which the cables are defined and are guided along the spring device. The cable carriers are elements in the manner of a cantilever laterally projecting from the spring device. The cables lie on these cable carriers or, when a larger number of cables is present, a plurality of cables can also lie above one another.

DE 10 2010 011 903 B4 discloses a further holding device for cables at an articulated vehicle. In this embodiment, the cables are gripped in a clamping manner by means of a fastening means and are fastened to a flexible restraining strap. The cables extend in a common plane with the restraining strap and the cables are arranged beneath the restraining strap.

DE 10 2016 214 159 A1 further discloses a holder for conducting cables in a rail vehicle. The holder grips the cables in a clamping manner and additionally has a plate-like element by which the cables are at least sectionally supported. The holder is upwardly supported by a part of the passage or of the vehicle.

It has been found that there is the demand in vehicles having vehicle parts movably connected to one another increasingly to conduct a larger number of cables and heavier cables between the vehicle parts in vehicles. Very large power cables in particular have to be conducted between the vehicle parts having an electrical drive. Conventional solutions for conducting cables can no longer satisfy these demands since the capacity present to receive and conduct the cables is exhausted. Wear that arises on the cables with conventional solutions represents a further problem. Excessive wear on the cables can result in their failure so that cables have to be replaced with a large effort and/or expense. This can moreover result in an increased safety risk in operation, e.g. when the insulation of power cables is damaged by wear.

SUMMARY OF THE INVENTION

The object of the invention is the further development of a system for conducting cables in a vehicle that is in particular also suitable for the conducting of a large number of cables, with simultaneously no increased wear having to be accepted or with the wear even being reduced. It is further the object of the invention to show a passage or a vehicle having such an improved system.

The object in accordance with the invention is achieved by a system for conducting cables in a vehicle having the features of independent claim 1. The object in accordance with the invention is further achieved by a passage having the features of independent claim 14 and by a vehicle having the features of independent claim 16.

It is the underlying recognition of the invention that on movements between two vehicle parts that are movably connected to one another, movements of cables relative to a stabilization element provided for the conducting of the cables necessarily occurs, with the movements becoming ever larger as the distance from the stabilization element increases. There are accordingly necessarily also wear phenomena in the solutions known from the prior art, such as in the solution known from EP 3 210 803 A1, in particular with outwardly disposed cables, when the cables move relative to the cable carriers and thus also relative to the stabilization element and in doing so rub against one another or against the cable carrier. In contrast, it is proposed in accordance with the invention that the required degree of freedom of movement is not provided in that the cables themselves are freely movable, but primarily in that they are arranged in a reception element, with the reception element being movably arranged at the stabilization element. On a movement of the two vehicle parts relative to one another, the cables can thus continue to move relative to the stabilization element in order thus to carry out the required compensation movements. However, this movement is made possible by the reception element movably arranged at the stabilization element. Wear phenomena accordingly primarily occur in the region of the movable arrangement of the reception element at the stabilization element, but not at the cables.

The system in accordance with the invention for conducting cables can in particular be used in a vehicle having vehicle parts that are movably connected to one another to there conduct the cables from the one vehicle part to the other vehicle part.

The vehicle can in particular be a road vehicle, e.g. an articulated bus. The system in accordance with the invention can, however, also be used in a rail vehicle such as a streetcar. The vehicle parts can in this respect each be drivable per se or only in a connected state.

The stabilization element is advantageously a part composed of flexible, thin material having a main direction of extent in the manner of a leaf spring. The stabilization element can, for example, be formed from a metal material. The stabilization element preferably has such a flexibility that it can extend in a bent form, for example in a C shape, from one vehicle to the next. The stabilization element predefines a defined extent of the cables and at least partly takes up the weight force of the cables so that an excessive kinking and a sagging of the cables can be avoided.

So that a cable can follow the extent of the stabilization element and so that weight forces can be transmitted, at least one reception element in which one cable or also a plurality of cables can be received is present between the stabilization element and the cable. The reception elements can be arranged directly or indirectly at the stabilization element. Depending on the length of the stabilization element and/or on the weight of the cable(s), it may be advantageous for the system in accordance with the invention to have a plurality of reception elements that are in particular distributed behind one another in the main direction of extent of the stabilization element so that a sagging of the cables between the vehicle parts or between individual reception elements is avoided. A plurality of reception elements can also be present transversely to the main direction of extent so that a plurality of cables or cable packets can be conducted in parallel with one another.

In accordance with the invention, the reception element is movably arranged at the stabilization element. On a movement of the vehicle parts relative to one another, the stabilization element represents a kind of neutral fiber whose length does not change. If cables are conducted to the side of the stabilization element, a relative movement results between the cables and the stabilization element on a movement of the vehicle parts relative to one another. Since the relative movement is primarily carried out by the reception element and not directly by the cable, the risk of a premature wear of the cable can be reduced, with the required compensation movements nevertheless being able to be carried out. It is in particular of advantage if the reception element is arranged at the stabilization element such that the spacing between the cables and the stabilization element can vary, for example by a displacement in a direction transverse to the main direction of extent of the stabilization element and/or by a pivoting of the reception element relative to the stabilization element.

It is particularly advantageous if the reception element is arranged in the main direction of extent of the stabilization element and transversely to the main direction of extent and pivotably at the stabilization element. In accordance with the invention, however, such embodiments are also covered in which the movement is only possible in one or two directions. It is advantageously a translatory displaceability of the reception element with respect to the stabilization element so that the reception element and thus also the cable received therein can carry out the main compensation movements on a movement of the two vehicle parts relative to one another.

Alternatively or additionally, the reception element can be pivotably arranged at the stabilization element.

In accordance with an embodiment of the invention, the reception element is arranged suspended at the stabilization element. The suspended arrangement can take place both indirectly, for example via a guide device, and directly at the stabilization element. A suspended arrangement is characterized in that the reception element is connected to the stabilization element in its upper region, in particular in the region above the cable receiver. A suspended arrangement is further characterized in that substantially only vertical forces are transmitted in the direction of the weight force in the installed state. The assembly can, for example, be implemented in a particularly simple manner by the suspended arrangement since the reception element only has to be suspended at the guide device without providing complex fastening means. In addition, the suspended arrangement provides the advantage that the components can be simply held due to the mechanical demands. The reception element and in particular its coupling section only have to take up the vertical weight forces. In addition, the reception element will always adopt a vertical orientation with a suspended arrangement. With a corresponding embodiment of the coupling section, it can be achieved by the suspended arrangement that the reception element always seeks the position at a defined zero point due to the acting weight force.

As already stated, the reception element can be indirectly arranged at the stabilization element. For this purpose, a guide device can be arranged at the stabilization element by which the reception element is indirectly movably arranged at the stabilization element. The guide device can specifically have a guide bar extending transversely to the main direction of extent. The reception element together with cables can thereby be arranged spaced apart from the stabilization element and/or a plurality of reception elements can be arranged next to one another. Due to the extent of the guide bar in the direction transverse to the main direction of extent, a movement of the reception element transversely to the main direction of extent can be made possible. A movement of the reception element relative to the stabilization element can be guided by the guide device. In order, however, to permit a defined relative movement between the stabilization element and the reception element and in order not to limit the movement play too much, a defined play can be present in the guide device and/or in the connection of the guide device to the reception element and/or in the connection of the guide device to the stabilization element.

The guide bar can only be arranged at one side or at both sides of the stabilization element. The guide bar, however, preferably extends at both sides of the stabilization element so that reception elements and cables can be conducted by one guide device at both sides of the stabilization element.

The guide bar advantageously has a bounding element at a free end so that the reception element cannot side off the guide bar. The position of the bounding means is particularly preferably flexibly adjustable on the guide bar so that the movement play of the reception means on the guide bar can be set.

Spring elements such as a compression spring, a rubber buffer or similar can be provided between a plurality of reception elements on a guide bar and/or in the direction of the bounding element and/or stabilization element. The reception element can in particular thus be acted on in the direction of its starting position. In addition, it can be prevented by a spring element arranged between two reception elements that the reception elements can come too close to one another and become entangled.

The reception element is advantageously suspended indirectly or directly at the stabilization element. For this purpose, the reception element preferably has a coupling section and a cable receiver. The coupling section serves the indirect or direct arrangement of the reception element at the stabilization element. The arrangement can take place in a suspended or carrying manner or in another design. The coupling section can in particular be configured such that the reception element can be suspended by it at the stabilization element or at a guide device arranged thereat. The coupling section can in particular be located in the upper region, in particular in the upper third, of the reception element with a suspended arrangement.

The cable receiver and the coupling section can be connected to one another in one piece or they can be separate parts that are connected to one another. The coupling section can, for example, have a roller that is movably arranged at the cable receiver.

In accordance with a particularly simple embodiment of the system in accordance with the invention, the coupling section has a cutout that serves the reception at the stabilization element or at the guide device. In this respect, the cutout has a main direction of extent that is substantially oriented in parallel with the main direction of extent of the stabilization element, whereby a displaceability of the reception element can be implemented with respect to the main direction of extent of the stabilization element. A coating and/or a material structure can be provided in the region of the cutout, e.g. to influence the sliding properties, so that the reception element is selectively very easily movable or rather difficult to move.

In a further embodiment, the main direction of extent of the cutout can be formed as arched and/or as elliptic in the cross-sectional form. The arched or elliptical cross-sectional form is advantageously of the kind that the vertex of the arch or of the elliptical cross-sectional shape forms a kind of zero point so that the reception element also moves into this position when the reception means is suspended due to the acting weight force.

In accordance with an alternative embodiment, the coupling section has a rotatably supported roller that is configured to roll and/or slide on a part along the conducting direction and thus to enable the movement between the reception element and the stabilization element. It can be sufficient for the roller to enable a movement of the reception element in the direction transverse to the main direction of extent of the stabilization element by a rolling off of the roller e.g. on the guide bar. In order also to make possible more complex compensation movements of the reception element and thus of the cable received by it relative to the stabilization element, it can, however, be advantageous for the roller to additionally permit a movement in a direction in the main direction of extent of the stabilization element. The roller can e.g. be configured for this purpose such that the guide bar can also be moved transversely to the roll-off direction on the roller. The roller can, for example, have a central guide groove as well as flanks laterally inclined thereto. A displacement of the reception element in the main direction of extent of the stabilization element can be made possible in dependence on the inclination of the lateral flanks.

In accordance with an embodiment, the reception element, in particular its cable receiver, has at least one opening for receiving at least one cable. It is advantageously an opening having a circular cross-section. A reception element can also have a plurality of openings, for example two to four openings, whereby a plurality of cables can be received by one and the same reception element. If the reception element has a plurality of openings, they are preferably arranged above one another and the plurality of openings particularly advantageously lie in a common vertical plane (with respect to the installed state of the system in the vehicle).

The reception of the cable in the opening preferably takes place in an immovable manner so that a relative movement between the cable and the reception element is avoided and wear is correspondingly reduced. To a limited extent, the reception of the cable can, however, also be movable to, for example, be able to compensate a stretching of a cable. All the openings particularly preferably have the same cross-section so that a large number of carryover parts can be manufactured. The cables are gripped directly or indirectly by means of the openings, i.e. the reception element can be in direct contact with the cable or at least one further component can be arranged between the cable and the reception element. Specifically, a spacer can be received in at least one opening that serves the adaptation of the free cross-section of the opening at a cross-section of the cable to be received. Cables having different cross-sections can thus, for example, be securely received in a reception element that has a plurality of openings having the same cross-section in that an additional spacer is arranged between the cable and the reception element on a reception of a comparatively thin cable.

In accordance with a further embodiment, the reception element, in particular the cable receiver, is designed in multiple parts. The reception element, in particular the cable receiver, is particularly preferably designed in two parts and the separation surface is formed by a plane extending centrally vertically through the reception element. It is particularly preferably a symmetrical division, with the two parts each having a half-shell (or a plurality of half-shells on a reception of a plurality of cables) for receiving the cable.

The reception element advantageously has two clamping jaws between which the cable is receivable in a clamping manner. The two clamping jaws can be connected to one another in a force-transmitting or shape-matched manner or with material continuity, for example by a screw connection, by a latch connection, or by an adhesive connection. The two clamping jaws can also be connected to one another in an articulated manner, for example by a film hinge. The clamping jaws can comprise a combination of different materials; the walls bounding the openings can, for example, be formed from a softer material, for example from a plastic, and the outer surfaces can be formed by a harder material, for example by a metal. Wear due to mutual rubbing of a plurality of reception elements can, for example, be counteracted by the use of a harder material at the outer side, while a secure reception of the cables can be ensured by the softer material, in particular in the region of the opening(s) for the cable(s), without there being risk of damage to the cable(s).

The invention additionally relates to a passage for two vehicle parts that are movably connected to one another, for example for a rail vehicle or for an articulated bus. In accordance with the invention, the passage has a system for conducting cables, wherein the system for conducting cables has at least one stabilization element and a reception element for receiving a cable, with the reception element being movably arranged at the stabilization element. A transition between two vehicle parts that are movably connected to one another as a rule has a joint connecting the two vehicle parts, a passage platform, and a passage bellows, for example a folding bellows. A passage bellows can have an additional peripheral frame, called a center frame, centrally, viewed in the direction of travel, for the stabilization of the passage bellows. The system in accordance with the invention for conducting cables particularly advantageously extends in the roof region of the passage, for example above a passage bellows of the passage or in the intermediate space between the passage bellows and the suspended ceiling of the passage. In accordance with a preferred embodiment, the system for conducting cables is indirectly or directly connected to the passage. The system for conducting cables is particularly advantageously connected to the center frame of the passage bellows. For example, a guide element of the system for conducting cables can have an additional connection device that serves the connection to the passage, in particular to the center frame of the passage bellows. The additional connection device can, for example, have at least one roller that rolls off directly at the center frame or at a component connected to the center frame such as is e.g. known from DE 10 2010 011 903 B4. The system for conducting cables is preferably arranged in a suspended manner at or standing on the center frame.

The invention is further directed to a vehicle, in particular to vehicle having vehicle parts that are movably connected to one another, wherein the vehicle has a previously mentioned passage and/or a previously mentioned system in accordance with the invention for conducting cables.

The statements on the system in accordance with the invention for conducting cables in a vehicle apply accordingly with respect to further preferred embodiments of the passage in accordance with the invention and of the vehicle in accordance with the invention.

BRIEF DESCRIPTION OF THE DRAWING

Further measures improving the invention will be shown in more detail below together with the description of preferred embodiments of the invention with reference to the Figures. There are shown.

DETAILED DESCRIPTION OF THE INVENTION

Figure 1:
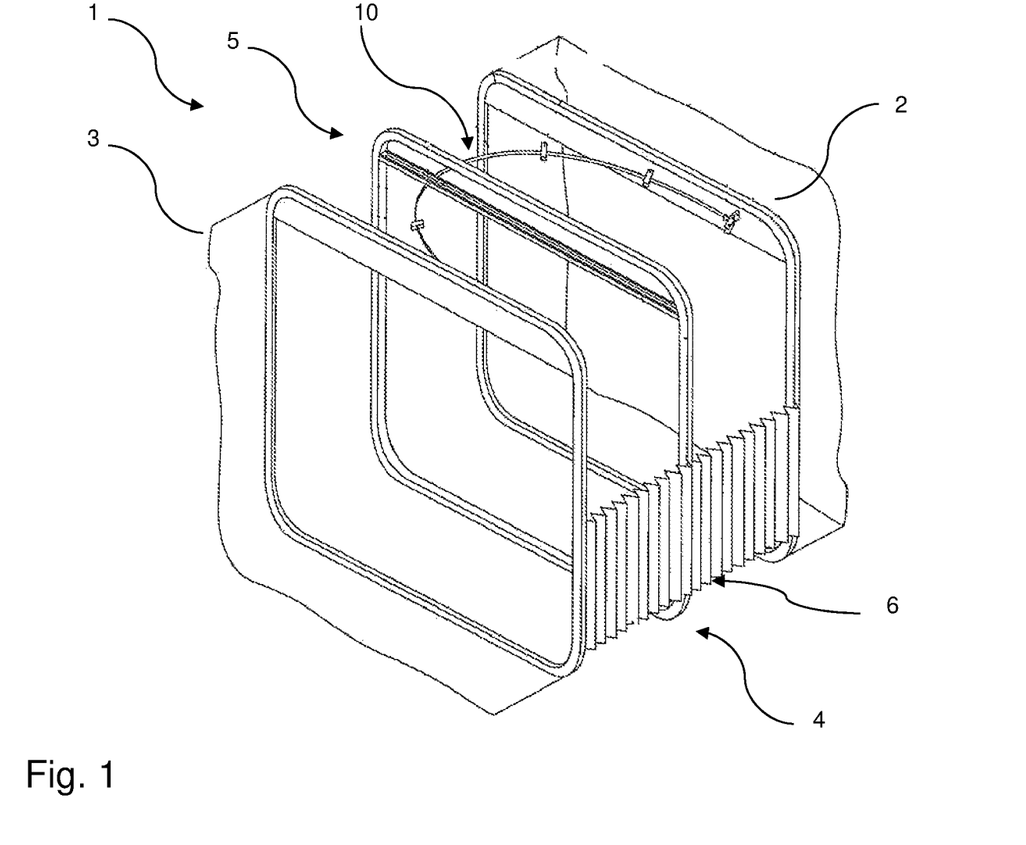
FIG. 1 is a perspective view of a passage of a vehicle having vehicle parts that are movably connected to one another, with a system for conducting cables being arranged in the roof region of the passage.

FIG. 1 shows a passage 4 between two vehicle parts 2, 3 of a vehicle 1, wherein the passage 4 connects the two vehicle parts 2, 3 to one another such that the passenger compartments of the vehicle parts 2, 3 are substantially continuously connected to one another. The passage 4 here connects the two vehicle parts 2, 3 movably to one another such that the vehicle parts 2, 3, can move relative to one another. The passage 4 substantially has a walkable floor region (not shown), a joint (not shown) connecting the two vehicle parts 2, 3, a bellows 6, and a center frame 5. FIG. 1 additionally shows the system 10 in accordance with the invention for conducting cables 11 in the roof region of the passage 4, wherein the representation in FIG. 1 only takes place schematically and not all the components of the system are shown.

Figure 2:
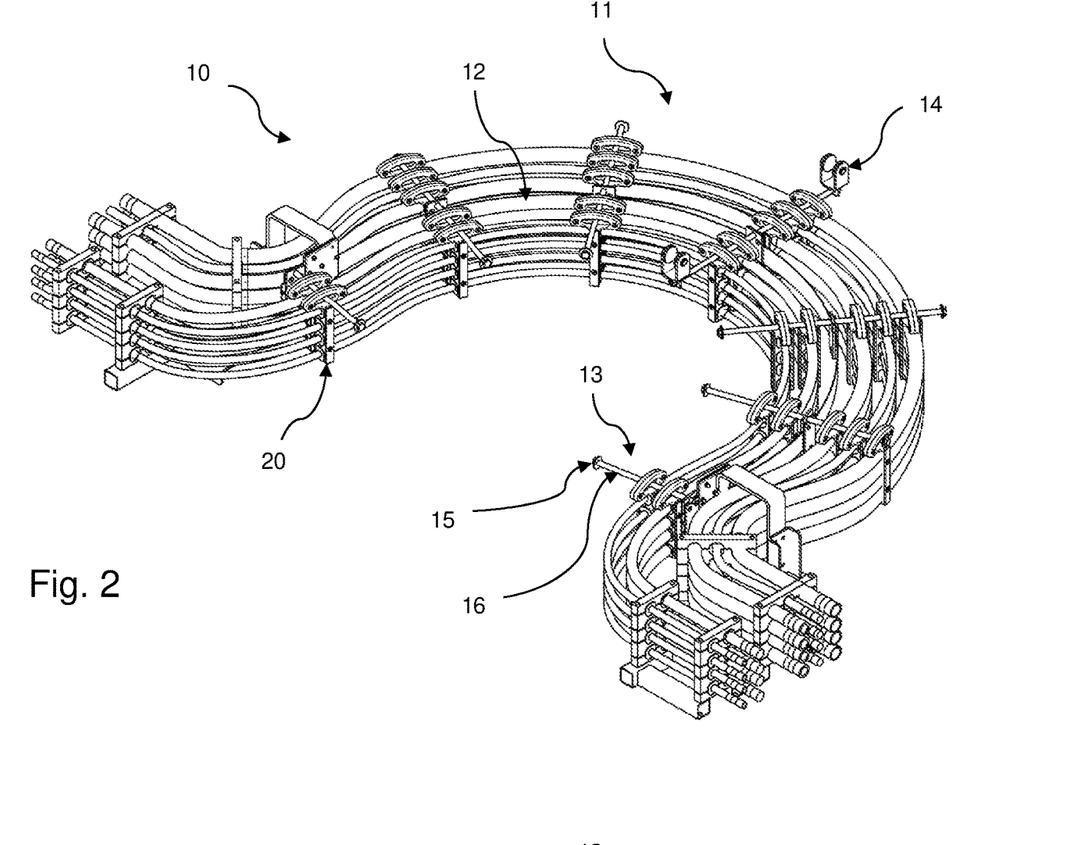
FIG. 2 is a perspective view of a system for conducting cables between two vehicle parts that are movably connected to one another.

FIG. 2 shows an embodiment of the system 10 in accordance with the invention for conducting cables 11. The system 10 has a stabilization element 12, a plurality of guide devices 13 having bounding means 15, and a connection device 14. The connection device 14 here serves the suspended arrangement of the system 10 at a passage 4, in particular at a center frame 5 of a passage 4.

The stabilization element 12 forms a neutral fiber of the system 10 and serves the reception of loads of the cables 11 and the defined conducting of the cables 11 between the vehicle parts 2, 3. The stabilization element 12 is typically a metal sheet in the manner of a leaf spring or a fiber composite material, for example based on fiberglass or carbon fiber.

In the embodiment shown in FIG. 2, a plurality of cables 11 are conducted next to one another and above one another at both sides of the stabilization element 12. In FIG. 2 a suspended arrangement of the cables 11 is shown, with the cables 11 being held by reception elements 20 and guide devices 13 at the stabilization element 12. In the embodiment shown in FIG. 2, a reception element 20 is respectively suspended at a guide bar 16 of a guide device 13 for this purpose. A free space can be recognized on the guide bar 16 between the reception element 20 and the bounding means 15 arranged at the end side at the guide bar 16. Said free space serves the movable arrangement of the reception element 20 with respect to the stabilization element 12. That is, the reception element 20 can move along the guide bar 16. In addition, depending on the driving situation, free spaces are produced between the reception elements 20 and the stabilization element 12 so that movements of the reception elements 20 are made possible relative to one another and/or relative to the stabilization element 12.

The system 10 is shown in a specific driving situation in FIG. 2, for example in the normal state of the two vehicle parts relative to one another. If the vehicle takes a corner, for example, the reception elements 20 are displaced on the guide bar 16 so that they e.g. come into contact with the bounding means 15. It is thus effectively prevented by the bounding means 15 that the reception elements 20 can slide down from the guide bar 16. The movement play can, however, thus also be directly limited.

A movability also results with respect to the position of the reception means 20 in the main direction of extent of the stabilization element 12. FIG. 2 shows the reception means 20 at a kind of zero point, i.e. the reception means 20 are located in the position at which the guide bars 16 approximately centrally engages through the cutout 24 and contacts it at its highest point. In a different driving situation, the reception elements 20 can move transversely to the guide bar 16 or in the main direction of extent of the stabilization element 12 such that the guide bar 16 engages off-center through the reception elements 20.

All the reception elements 20 can adopt different positions with respect to the stabilization element 12 independently of one another, i.e. there can e.g. be reception elements 20 that are completely inwardly displaced while other reception elements 20 are completely outwardly displaced.

Figure 3:
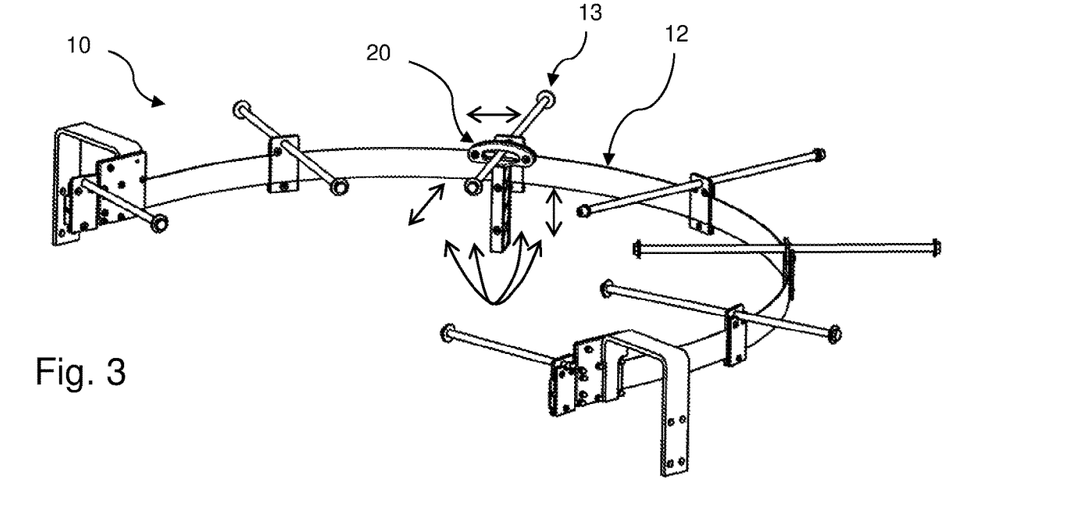
FIG. 3 is a perspective view of the system for conducting cables in accordance with FIG. 2, with in particular the cables and some reception elements not being shown.

FIG. 3 shows a system in accordance with FIG. 2, with the cables 11 in particular not being shown and with also only one reception element 20 being shown. By way of example, the system 10 has seven guide devices 13. Two possible embodiments of the guide device 13 are shown. In both cases, the guide device 13 has a guide bar 16 that projects in a transverse direction from the stabilization element with respect to the main direction of extent of the stabilization element 12. The first embodiment of the guide device 13 shown has a guide bar 16 that projects from the stabilization element 12 at both sides. The second embodiment of the guide device 13 has a guide bar 16 that only projects from the stabilization element 12 in one direction.

The direction arrows shown in FIG. 3 relate to possible movements of the one reception element 20, shown by way of example, with respect to the stabilization element 12. The reception element 20 can substantially carry out movements with respect to the main direction of extent of the stabilization element 12 in the longitudinal direction and/or in the transverse direction and/or in the vertical direction and/or can carry out a pivot movement. The freedom of movement here can be restricted to a single direction of movement or to a plurality of directions of movement. The stabilization element 20 can also carry out the different movements in combination.

Figure 4:
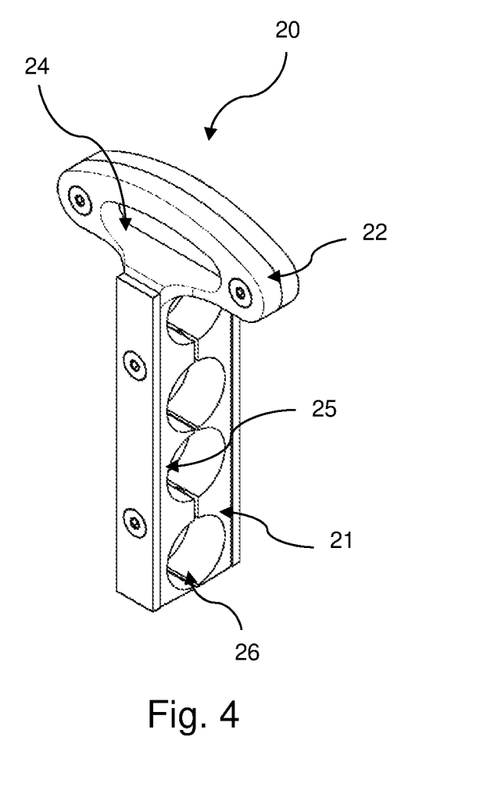
FIG. 4 is a perspective view of an embodiment of a reception element.

FIG. 4 shows a possible embodiment of a reception element 20. The reception element 20 shown by way of example has two regions, namely a cable reception 21 and a coupling section 22. The embodiment of the reception element 20 shown is an embodiment that is particularly adapted to the suspended arrangement. The coupling section 22 is correspondingly arranged in the upper region of the reception element 20. The coupling section has a cutout 24 that has an elongate or elliptical cross-section in the embodiment shown. The cutout 24 has a main direction of extent that is the same as the main direction of extent of the stabilization element 12 and the cutout 24 is formed as arched in its main direction of extent. The arch serves to implement a zero point which has a position the reception element strives toward due to the acting weight force.

The cable reception 21 has a plurality of openings 25 that serve the reception of cables. The reception element 20 in accordance with FIG. 4 has by way of example four openings 25 that have the same cross-sections and that are arranged above one another in a common plane. Up to four cables can thus be received by one reception element 20. It is achieved here by the arrangement in one plane that they are each arranged at substantially the same distance from the stabilization element 12 so that the same forces substantially act on the cables when the vehicle parts move relative to one another and they can be compensated together by the compensation movement of the reception element 20.

If cables having different cable cross-sections are to be received by the reception element 20, a spacer, not shown in FIG. 4, can be placed into the openings 25, whereby the free cross-section can be adapted to the respective cable cross-section and the respective cable can thus be securely received.

The reception element 20 in accordance with FIG. 4 is designed in two parts and has two clamping jaws 26 between which the cables 11 are clamped. The two halves or the two clamping jaws 26 of the reception element 20 are connected to one another, for example, by a screw connection. It is indicated in FIG. 4 that the reception element 20 comprises two different materials, namely a softer material that forms the walls of the openings 25 and a harder material that forms the outer side of the reception element 20.

Figure 5:
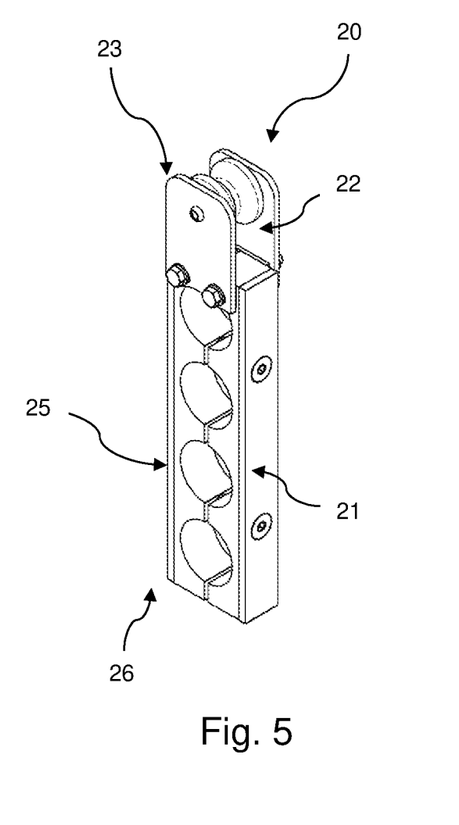
FIG. 5 is a perspective view of a further embodiment of a reception element.

FIG. 5 shows a further embodiment of a reception element 20, with this embodiment only differing from that of FIG. 4 in the configuration of the coupling section 25. The coupling section 22 is here substantially formed by a roller 23 that is rotatably fastened to the cable receiver 21. The roller 23 enables a movement of the reception element in a direction transversely to the main direction of extent of the stabilization element 12 by a rolling off of the roller 23 on the guide bar 16. In a further embodiment, the roller 23 also enables a movement in a direction lengthways to the main direction of extent of the stabilization element 12 in that the roller 23 is configured such that it enables a displacement of the roller 23 in a corresponding direction. In accordance with a further embodiment, the roller 23 enables a pivoting movement of the reception element 20 and/or a vertical movement of the reception element 20 with respect to the stabilization element 12. The roller 23 can, for example, have a guide groove on its running surface that essentially serves the movement and guiding of the reception element 20 in a direction transversely to the main direction of extent of the stabilization element 12. The roller can have lateral flanks on its running surface that have an inclination and that enable a lateral displacement of the guide bar 16 on the roller 23 and/or a pivoting of the reception element 20 with respect to the stabilization element 12.

Figure 6:
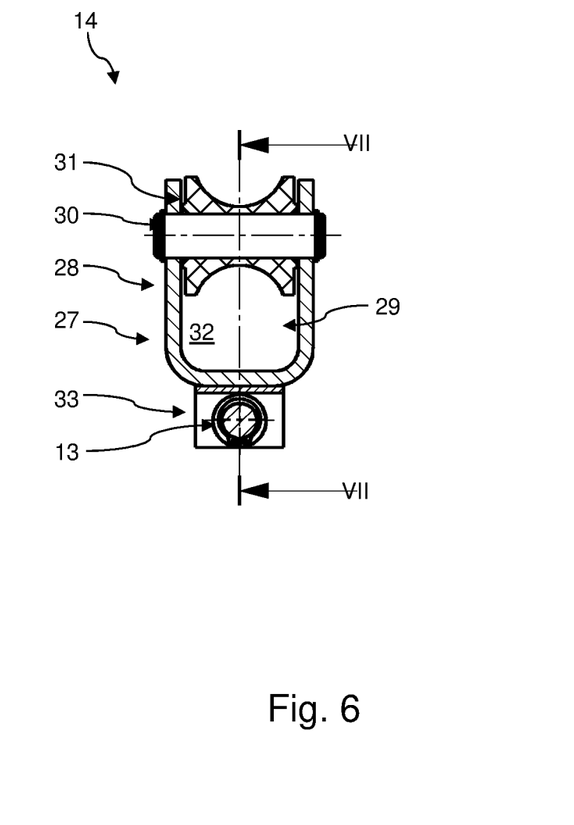
FIG. 6 is a connection device in a sectional view.
Figure 7:
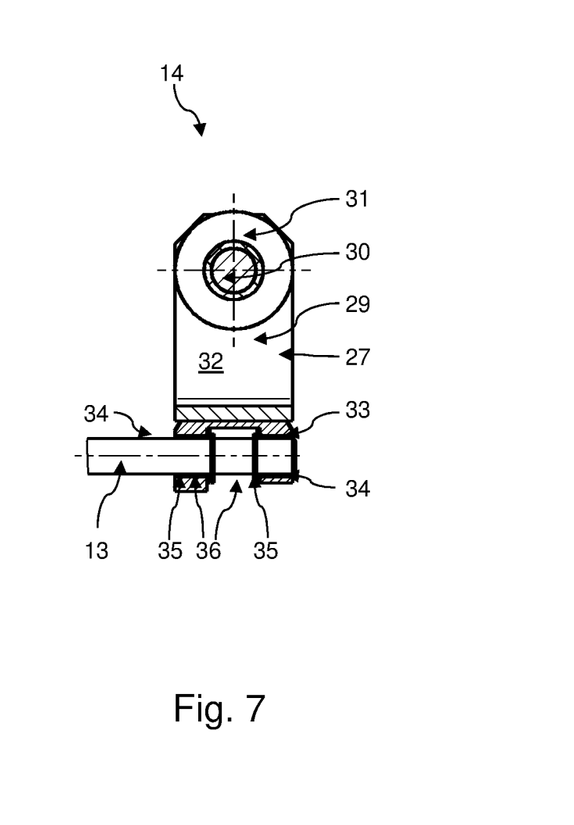
FIG. 7 is the connection device in in accordance with FIG. 6 in a sectional view.

The connection device 14 for the suspended arrangement of the guide bar 13 and thus of the system 10 at the center frame 5 or at a crossbar of the center frame 5 is shown in detail in FIGS. 6 and 7. As shown in FIG. 6, the connection device 14 has a substantially U-shaped carrier element 27. In the region of the one end section of the carrier element 27, a pin 30 on which a roller 31 is rotatably supported is provided between its two limbs 28, 29. The region between the two limbs 28, 29 and the pin 30 forms a receiver 32 for the crossbar of the center frame 5, with the roller 31 being able to roll off on the crossbar—in the assembled state.

A reception element 33 for receiving the guide device 13 is provided In the region of the lower end section of the carrier element 27. The guide device 13 can be fixedly received in the reception element. In the embodiment shown in FIGS. 6 and 7, the guide device 13 is, however, received rotatably about its longitudinal axis in the reception element 33. Specifically, in the shown embodiment, two cutouts 34 having sliding sleeves 35 arranged therein are provided for this purpose through which the guide device 13 extends. To secure the reception of the guide device 13 with respect to movements in the direction of its longitudinal axis, securing elements 35 are provided in the region of both cutouts 34.

Different movements can thus be taken up overall. On the one hand, a transverse movement of the stabilization element 12 relative to the center frame 5 can be taken up in that the roller 31 runs along the crossbar of the center frame 5. On the other hand, a pivot movement of the connection device 14 about the crossbar is made possible. The carrier element 27 rotates about the crossbar as part of the pivot movement. As a result of the pivot movement, the reception element 34 moves on a circular path about the crossbar. On a fixed reception of the guide device 13 in the reception element 34, this can result in strains in the connection region between the guide device 13 and the reception element 34 and/or in the connection region between the guide device 13 and the stabilization element 12. If the guide device 13 is rotatably received in the reception element 34 (as in the embodiment in accordance with FIGS. 6 and 7), a compensation movement can, however, be carried out on the rotational movement of the guide device 13 about the crossbar. Specifically, the guide device 13 here rotates about its longitudinal axis in the cutouts 34 as part of the movement of the reception element 34 on the circular path about the crossbar.

A flexibility with respect to the position and orientation of the guide device 13 relative to the center frame 5 is ultimately achieved by these different degrees of the freedom of movement. As part of the movements occurring in operation, the orientation and the position of the guide device 13 can therefore change relative to the center frame 5 so that the loads are minimized that act on the guide device 13, on the stabilization element 12, and/or on the respective connection points. The movement of the two connection devices 14 arranged opposite one another (see FIG. 2) can here in particular be in opposite senses.

REFERENCE NUMERAL LIST 1 vehicle
2 vehicle part
3 vehicle part
4 passage
5 center frame
6 bellows
10 system
11 cable
12 stabilization element
13 guide device
14 connection device 15 bounding means
16 guide bar
20 reception element
21 cable receiver
22 coupling section
23 roller
24 cutout
25 opening
26 clamping jaw
27 carrier element
28 limb
29 limb
30 pin
31 roller
32 receiver
33 reception element
34 cutout
35 sleeve
36 securing element

The invention claimed is:

1. A system for conducting cables in a vehicle having vehicle parts that are movably connected to one another, comprising:
a stabilization element extending from one of the vehicle parts to the other of the vehicle parts in a bent form; and
a reception element for receiving a cable, wherein the reception element is movably coupled to the stabilization element with respect to the stabilization element in a main direction extending along the stabilization element.

2. The system of claim 1, wherein the reception element is movably coupled to the stabilization element in one or both directions transversely to the main direction of extent, or both with respect to the main direction.

3. The system of claim 1, wherein the reception element is pivotably arranged at the stabilization element.

4. The system of claim 1, wherein the reception element is arranged suspended indirectly or directly at the stabilization element.

5. The system of claim 1, further comprising a guide device arranged at the stabilization element, wherein the reception element is indirectly movably arranged at the stabilization element by the guide device.

6. The system of claim 5, wherein the guide device is a guide bar extending transversely to the main direction of the stabilization element.

7. The system of claim 6, further comprising a bounding element arranged at a free end of the guide bar to limit a movement of the reception element along the guide bar.

8. The system of claim 1, wherein the reception element comprises a cable receiver and a coupling section, and the reception element is indirectly or directly arranged at the stabilization element by the coupling section.

9. The system of claim 8, wherein the coupling section has a cutout whose main direction of extent in an installed state is substantially oriented in parallel with the main direction of the stabilization element.

10. The system of claim 9, wherein the cutout is formed as arched in the main direction of the cutout in the installed state.

11. The system of claim 8, wherein the coupling section has a roller rotatably supported at the cable receiver.

12. The system of claim 8, wherein the cable receiver has an opening for receiving at least one cable.

13. The system of claim 12, wherein a spacer is receivable in the opening for adapting a free cross-section of the opening to a cross-section of the cable to be received.

14. The system of claim 1, wherein the reception element comprises two clamping jaws between which the cable to be clamped is receivable.

15. A passage for connecting two vehicle parts, comprising:
two vehicle parts that are movably connected to one another;
the system for conducting cables in accordance with claim 1; and
a passage, wherein the passage connects the two vehicle parts, and the passage comprises the system for conducting cables.

16. The passage of claim 15, further comprising:
a center frame of the passage; and
a connection apparatus, wherein the connection apparatus connects the system for conducting cables to the center frame of the passage.

17. A vehicle, comprising:
vehicle parts that are movably connected to one another;
the system for conducting cables in accordance with claim 1; and
a passage for connecting the vehicle parts.

* * * * *